United States Patent
Otake et al.

(10) Patent No.: US 12,469,675 B2
(45) Date of Patent: Nov. 11, 2025

(54) PHASE ANALYZER, SAMPLE ANALYZER, AND ANALYSIS METHOD

(71) Applicant: JEOL Ltd., Tokyo (JP)

(72) Inventors: Yuka Otake, Tokyo (JP); Atsuhiro Fujii, Tokyo (JP)

(73) Assignee: JEOL Ltd., Tokyo (JP)

( * ) Notice: Subject to any disclaimer, the term of this patent is extended or adjusted under 35 U.S.C. 154(b) by 453 days.

(21) Appl. No.: 17/978,518

(22) Filed: Nov. 1, 2022

(65) Prior Publication Data

US 2023/0135601 A1    May 4, 2023

(30) Foreign Application Priority Data

Nov. 2, 2021   (JP) ................ 2021-179616

(51) Int. Cl.
*G01N 23/2251*    (2018.01)
*H01J 37/26*      (2006.01)
*H01J 37/28*      (2006.01)

(52) U.S. Cl.
CPC ............ *H01J 37/28* (2013.01); *H01J 37/261* (2013.01)

(58) Field of Classification Search
CPC .. H01J 37/00; H01J 37/02; H01J 37/26; H01J 37/28; H01J 37/261; G01N 2223/405; G01N 2223/605; G01N 23/2252
USPC .................. 250/306, 307, 310, 311
See application file for complete search history.

(56) References Cited

U.S. PATENT DOCUMENTS

2018/0342087 A1*  11/2018  Katoh ................ G06T 11/008

FOREIGN PATENT DOCUMENTS

JP       2018200270 A    12/2018

OTHER PUBLICATIONS

Extended European Search Report issued in EP22204572.6 on Feb. 21, 2023.
Pieter Botha and Hanna Horsch, Augmenting SEM-EDS Phase Classification using Data Projection and Cluster Analysis, Oct. 16, 2018, retrieved from the Internet at https://www.linkedin.com/pulse/augmenting-sem-eds-phase-classification-using-data-projection-botha.
Pieter Botha, Working with High-Dimensional Data Part 2: Classification by Cluster Analysis, Nov. 28, 2017, retrieved from the Internet at https://minassist.com.au/working-with-high-dimensional-data-part-2-classification-by-cluster-analysis.

* cited by examiner

*Primary Examiner* — Jason L McCormack
(74) *Attorney, Agent, or Firm* — The Webb Law Firm

(57) ABSTRACT

A phase analyzer includes a data acquisition unit that acquires spectrum imaging data in which a position on a sample is associated with a spectrum of a signal from the sample; a phase analysis unit that performs phase analysis based on the spectrum imaging data; a display control unit that displays results of the phase analysis on a first screen; and a condition reception unit that receives an operation for changing a condition for the phase analysis, when the condition reception unit has received the operation for changing the condition, the phase analysis unit performing phase analysis under the changed condition, the display control unit displaying on a second screen the results of the phase analysis performed under the changed condition and when a predetermined operation has been performed, the display control unit reflecting on the first screen the results of the phase analysis displayed on the second screen.

7 Claims, 13 Drawing Sheets

NUMBER OF CLUSTERS

| DATA NO. | CLASSIFICATION NAME | SPECTRAL SHAPE | QUANTITATIVE RESULT |
|---|---|---|---|
| 1 | $SiO_2$ | | Si:47.3269%<br>O:52.6731% |
| 2 | SiC | | Si:68.9845%<br>C:31.0155% |
| 3 | $SiF_2$ | | Si:41.5124%<br>F:58.4876% |

⋮

| DATA NO. | COMPOUND NAME | COMPOSITION |
|---|---|---|
| 1 | $SiO_2$ | Si:46.744559%<br>O:53.255441% |
| 2 | $Si_2O_3$ | Si:53.9235%<br>O:46.0765% |
| 3 | AlCu | Al:29.8048%<br>Cu:70.1952% |

PHASE ANALYZER, SAMPLE ANALYZER, AND ANALYSIS METHOD

CROSS-REFERENCE TO RELATED APPLICATION

This application claims priority to Japanese Patent Application No. 2021-179616, filed Nov. 2, 2021, the disclosure of which is hereby incorporated by reference in its entirety.

BACKGROUND OF THE INVENTION

Field of the Invention

The present invention relates to a phase analyzer, a sample analyzer, and an analysis method.

Description of Related Art

In a scanning electron microscope equipped with an X-ray detector such as an energy-dispersive X-ray spectrometer (EDS) or a wavelength-dispersive X-ray spectrometer (WDS), spectrum imaging data, in which a position on a sample and an X-ray spectrum are associated with each other, can be obtained. As a technique for determining a distribution of compounds by using spectrum imaging data, phase analysis is known.

For example, JP-A-2018-200270 discloses a phase analyzer in which a graph illustrating an X-ray intensity of each element and a concentration of each element by means of areas is displayed along with a phase map showing a distribution of compounds to facilitate understanding of characteristics of compositions of the compounds.

In the phase analysis, favorable phase analysis results cannot be obtained unless analysis conditions are appropriate. For that reason, it is required to change analysis conditions and repeat phase analysis to find appropriate conditions. However, when the analysis conditions are changed and the phase analysis is repeated, in order to confirm the phase analysis results obtained prior to the condition change, the phase analysis has to be performed again under the original conditions.

SUMMARY OF THE INVENTION

A phase analyzer according to a first aspect of the invention includes:
  a data acquisition unit that acquires spectrum imaging data in which a position on a sample is associated with a spectrum of a signal from the sample;
  a phase analysis unit that performs phase analysis based on the spectrum imaging data;
  a display control unit that displays results of the phase analysis on a first screen; and
  a condition reception unit that receives an operation for changing a condition for the phase analysis,
  when the condition reception unit has received the operation for changing the condition, the phase analysis unit performing phase analysis under the changed condition,
  the display control unit displaying on a second screen the results of the phase analysis performed under the changed condition, and
  when a predetermined operation has been performed, the display control unit reflecting on the first screen the results of the phase analysis displayed on the second screen.

A sample analyzer according to a second aspect of the invention includes the above phase analyzer.

An analysis method according to a third aspect of the invention includes:
  acquiring spectrum imaging data in which a position on a sample is associated with a spectrum of a signal from the sample;
  performing phase analysis based on the spectrum imaging data;
  displaying results of the phase analysis on a first screen;
  when a condition for the phase analysis has been changed, performing phase analysis under the changed condition, and displaying on a second screen the results of the phase analysis performed under the changed condition; and
  reflecting on the first screen the results of the phase analysis displayed on the second screen when a predetermined operation has been performed.

BRIEF DESCRIPTION OF THE DRAWINGS

FIG. 8 is a table for describing a second database.

DESCRIPTION OF THE INVENTION

Figure 1:
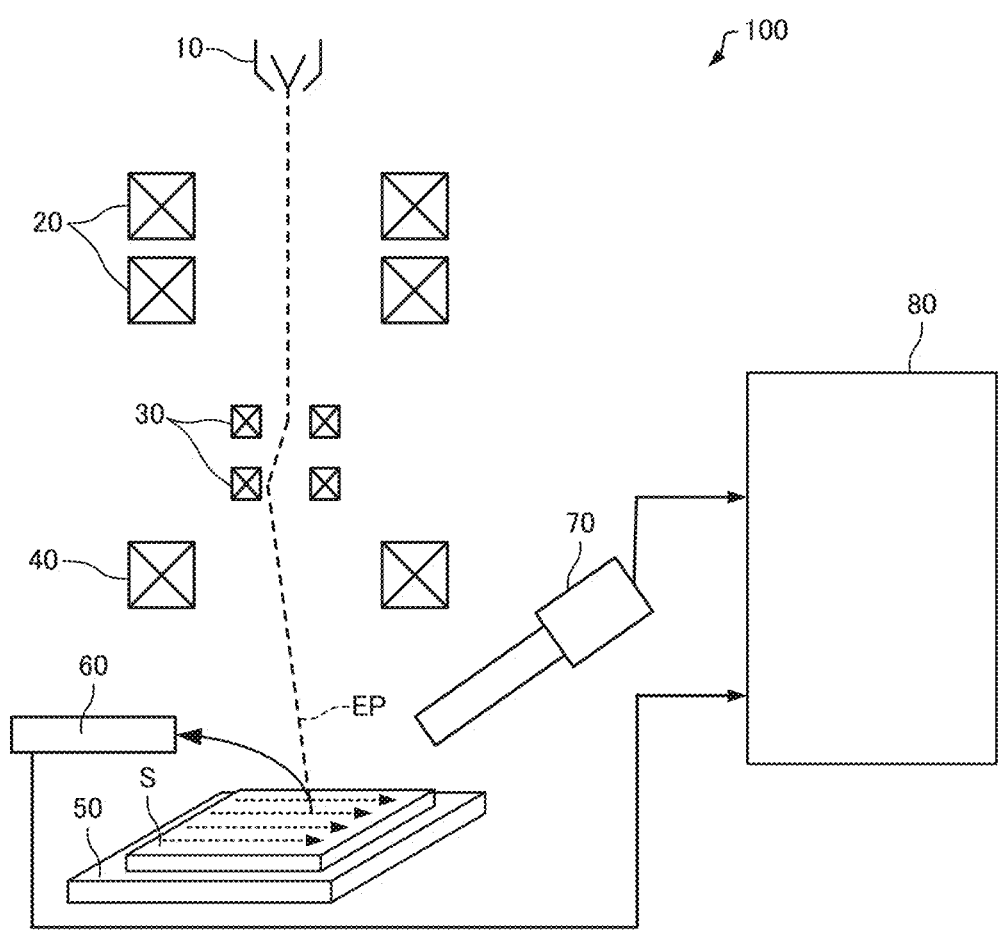
FIG. 1 is a diagram illustrating a configuration of a sample analyzer including a phase analyzer according to an embodiment of the invention.

A phase analyzer according to an embodiment of the invention includes:
  a data acquisition unit that acquires spectrum imaging data in which a position on a sample is associated with a spectrum of a signal from the sample;
  a phase analysis unit that performs phase analysis based on the spectrum imaging data;
  a display control unit that displays results of the phase analysis on a first screen; and
  a condition reception unit that receives an operation for changing a condition for the phase analysis, when the condition reception unit has received the operation for changing the condition, the phase analysis unit performing phase analysis under the changed condition, the display control unit displaying on a second screen the results of the phase analysis performed under the changed condition, and when a predetermined operation has been performed, the display control unit reflecting on the first screen the results of the phase analysis displayed on the second screen.

In the phase analyzer, the phase analysis results before the change of the condition for phase analysis can be displayed on the first screen, and the phase analysis results after the change of the condition for the phase analysis can be displayed on the second screen. For that reason, in the phase analyzer, even if the condition is repeatedly changed, the phase analysis results before the change of the condition can be easily confirmed.

A sample analyzer according to an embodiment of the invention includes the above phase analyzer.

An analysis method according to an embodiment of the invention includes:

acquiring spectrum imaging data in which a position on a sample is associated with a spectrum of a signal from the sample;

performing phase analysis based on the spectrum imaging data;

displaying results of the phase analysis on a first screen;

when a condition for the phase analysis has been changed, performing phase analysis under the changed condition, and displaying on a second screen the results of the phase analysis performed under the changed condition; and reflecting on the first screen the results of the phase analysis displayed on the second screen when a predetermined operation has been performed.

In the analysis method, the results of the phase analysis before the change of the condition for the phase analysis can be displayed on the first screen, and the results of the phase analysis after the change of the condition can be displayed on the second screen. For that reason, in the analysis method, even if the condition is repeatedly changed, the results of the phase analysis before the change of the condition can be easily confirmed.

Preferred embodiments of the invention will be described in detail below with reference to the figures. It is noted that the embodiments described below do not unduly limit the scope of the invention described in the claims. In addition, all of the components described below are not necessarily essential requirements of the invention.

1. ANALYZER

First, a phase analyzer according to an embodiment of the invention will be described with reference to the figures. FIG. 1 is a diagram illustrating a configuration of a sample analyzer 100 including a phase analyzer 80 according to an embodiment of the invention.

The sample analyzer 100 is a scanning electron microscope equipped with an X-ray detector 70. In the sample analyzer 100, by scanning a sample S with an electron probe EP, spectrum imaging data in which a position on the sample S is associated with an X-ray spectrum can be acquired.

As illustrated in FIG. 1, the sample analyzer 100 includes an electron gun 10, a condenser lens 20, a scanning coil 30, an objective lens 40, a sample stage 50, a secondary electron detector 60, the X-ray detector 70, and the phase analyzer 80.

The electron gun 10 emits an electron beam. The electron gun 10, for example, accelerates electrons emitted from a cathode at an anode to emit the electron beam.

The condenser lens 20 and the objective lens 40 focus the electron beam emitted from the electron gun 10 to form the electron probe EP. A probe diameter and a probe current thereof can be controlled by the condenser lens 20.

The scanning coil 30 two-dimensionally deflects the electron probe EP. By two-dimensionally deflecting the electron probe EP with the scanning coil 30, the sample S can be scanned with the electron probe EP.

The sample stage 50 can hold the sample S. The sample stage 50 has a moving mechanism for moving the sample S.

The secondary electron detector 60 detects secondary electrons emitted from the sample S when the sample S is irradiated with the electron beam. The sample S is scanned by the electron probe EP, and the secondary electrons emitted from the sample S are detected by the secondary electron detector 60, so that a secondary electron image can be obtained. Also, the sample analyzer 100 may include a backscattered electron detector that detects backscattered electrons emitted from the sample S when the sample S is irradiated with the electron beam.

The X-ray detector 70 detects characteristic X-rays emitted from the sample S when the sample S is irradiated with the electron beam. The X-ray detector 70 is, for example, an energy-dispersive X-ray detector. Also, the X-ray detector 70 may be a wavelength-dispersive X-ray spectroscope. Spectrum imaging data can be obtained by scanning the sample S with the electron probe EP and detecting characteristic X-rays emitted from the sample S with the X-ray detector 70.

Spectrum imaging data is data in which positions (coordinates) on a sample and spectra based on signals from the sample are associated with each other. In the sample analyzer 100, data in which positions on the sample S are associated with X-ray spectra can be obtained as the spectrum imaging data. In the sample analyzer 100, while the sample S is scanned with the electron probe EP, the X-ray spectra are collected for each pixel, and the positions on the sample S (coordinates of pixels) and the X-ray spectra are associated with each other and stored.

The phase analyzer (information processing device) 80 performs phase analysis using the spectrum imaging data and displays phase analysis results. In addition, the phase analyzer 80 can analyze and edit the phase analysis results.

Figure 2:
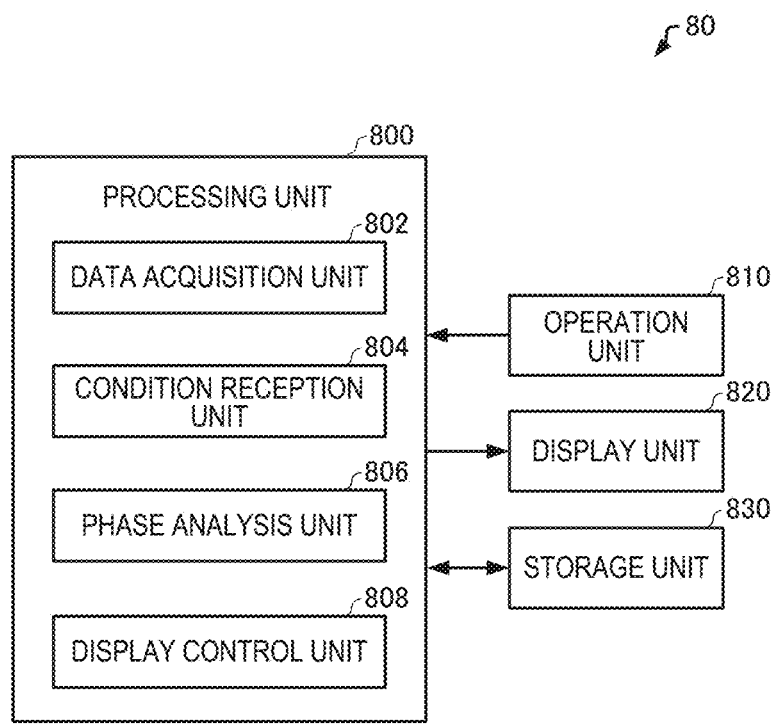
FIG. 2 is a diagram illustrating a configuration of a phase analyzer according to an embodiment of the invention.

FIG. 2 is a diagram illustrating a configuration of the phase analyzer 80.

As illustrated in FIG. 2, the phase analyzer 80 includes a processing unit 800, an operation unit 810, a display unit 820, and a storage unit 830.

The operation unit 810 is used by a user to input operation information and outputs input operation information to the processing unit 800. Functions of the operation unit 810 can be implemented by input devices such as a keyboard, a mouse, buttons, a touch panel, and a touch pad.

The display unit 820 is for displaying images generated by the processing unit 800, and its functions can be realized by a display such as a liquid crystal display (LCD) or a cathode ray tube (CRT).

The storage unit 830 stores programs and various data for causing a computer to function as each part of the processing unit 800. In addition, the storage unit 830 also functions as a work area for processing unit 800. Functions of the storage unit 830 can be realized by a hard disk, a random access memory (RAM), or the like.

The processing unit 800 executes the programs stored in the storage unit 830, and thus functions as a data acquisition unit 802, a condition reception unit 804, a phase analysis unit 806, and a display control unit 808, which will be described below. Functions of the processing unit 800 can be realized by executing a program using hardware such as various processors (a CPU, a DSP, etc.) and ASIC (a gate array, etc.). The processing unit 800 includes the data acquisition unit 802, the condition reception unit 804, the phase analysis unit 806, and the display control unit 808.

The data acquisition unit 802 acquires the spectrum imaging data obtained by analyzing the sample S with the sample analyzer 100.

The condition reception unit 804 receives an operation for changing conditions for phase analysis.

The phase analysis unit 806 performs the phase analysis by performing multivariate analysis on the spectrum imaging data. As the phase analysis results, a phase map, a phase spectrum, an area fraction, a phase name (a compound name and compositional information), and the like are obtained. The phase map is an image that shows a distribution of compounds.

The display control unit 808 causes the display unit 820 to display the phase analysis results.

2. ANALYSIS METHOD

2.1. Acquisition of Spectrum Imaging Data

The data acquisition unit 802 acquires the spectrum imaging data obtained by analyzing the sample S with the sample analyzer 100. In the sample analyzer 100, the sample S is scanned with the electron probe EP to detect the X-rays emitted from the sample S with the X-ray detector 70, and the X-ray spectrum data is acquired at each detected position. The detected positions (coordinates on the sample S) and the X-ray spectrum data are associated with each other and stored. Thus, the spectrum imaging data can be obtained.

2.2. Reception of Conditions for Phase Analysis

The condition reception unit 804 receives the conditions for phase analysis. The conditions for phase analysis are, for example, the number of phases. When the user performs an operation to specify the number of phases on the operation unit 810, the condition reception unit 804 receives an operation for changing the conditions for phase analysis and acquires information on the number of phases specified by the user.

Also, the conditions for phase analysis are not limited to the number of phases. For example, as the conditions for phase analysis, conditions such as smoothing, pixel binning, normalization of spectrum intensity, and parameters (a size of a region D and a threshold) in a process of combining phases, which will be described later, can be exemplified.

Smoothing is a process of blurring an image. Pixel binning is a process of regarding a plurality of adjacent pixels as one pixel in spectrum imaging data acquired for each pixel. Normalization of spectrum intensity refers to increasing intensity of a peak of interest in a spectrum relative to other peaks. Thus, the peak of interest is treated as a feature of analysis target data in multivariate analysis, which will be described later. The parameters in the process of combining phases will be described later in a "<process of combining edge phases>." Varying these conditions alters the phase analysis results that are obtained.

2.3. Phase Analysis

The phase analysis unit 806 performs phase analysis on spectrum imaging data. The phase analysis is performed using, for example, multivariate analysis. As the multivariate analysis, methods such as self-organizing maps (SOM), a hierarchical clustering method, a K-means method, principal component analysis, singular value decomposition, non-negative matrix decomposition, vertex component analysis, and the like can be exemplified. Also, these methods may be used in combination.

The phase analysis unit 806 performs the phase analysis in accordance with the conditions received by the condition reception unit 804. For example, in a case in which the condition reception unit 804 receives an operation for specifying the condition for the number of phases, the phase analysis unit 806 performs the phase analysis such that the number of phase maps corresponding to the designated number of phases is created.

Also, in a case in which the number of phases is not specified, the phase analysis unit 806 may estimate the number of phases using multivariate analysis. The phase analysis unit 806, for example, performs cluster analysis on the spectrum imaging data to estimate the number of phases. Cluster analysis is a type of multivariate analysis and is unsupervised learning of collecting similar data in data groups and classifying it. Here, as the cluster analysis, a case of estimating the number of phases by combining the self-organizing maps and a hierarchical clustering method will be described.

The phase analysis unit 806 first creates the self-organizing maps of the spectrum imaging data. The phase analysis unit 806 learns the self-organizing maps using spectrum data of each pixel constituting the spectrum imaging data as input vectors. This creates a map space that associates the input vectors with each other. In the map space, a degree of similarity of spectrum data is represented by a distance. The phase analysis unit 806 sorts the spectrum data into groups based on the distance on the map space and creates clusters. A cluster is a collection of similar input vectors (spectrum data).

The phase analysis unit 806 uses the clusters obtained using the self-organizing maps as minimum unit clusters and merges the minimum unit clusters using a hierarchical clustering method to create new clusters.

Figure 3:
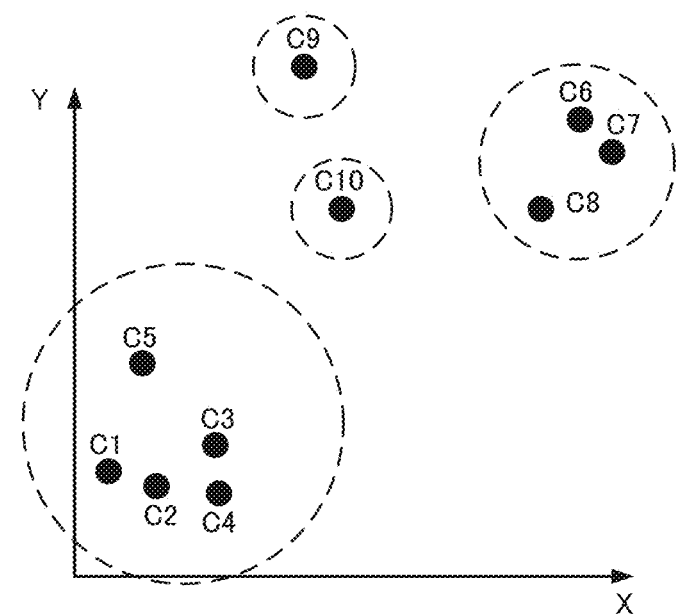
FIG. 3 is a diagram for describing a hierarchical clustering method.
Figure 4:
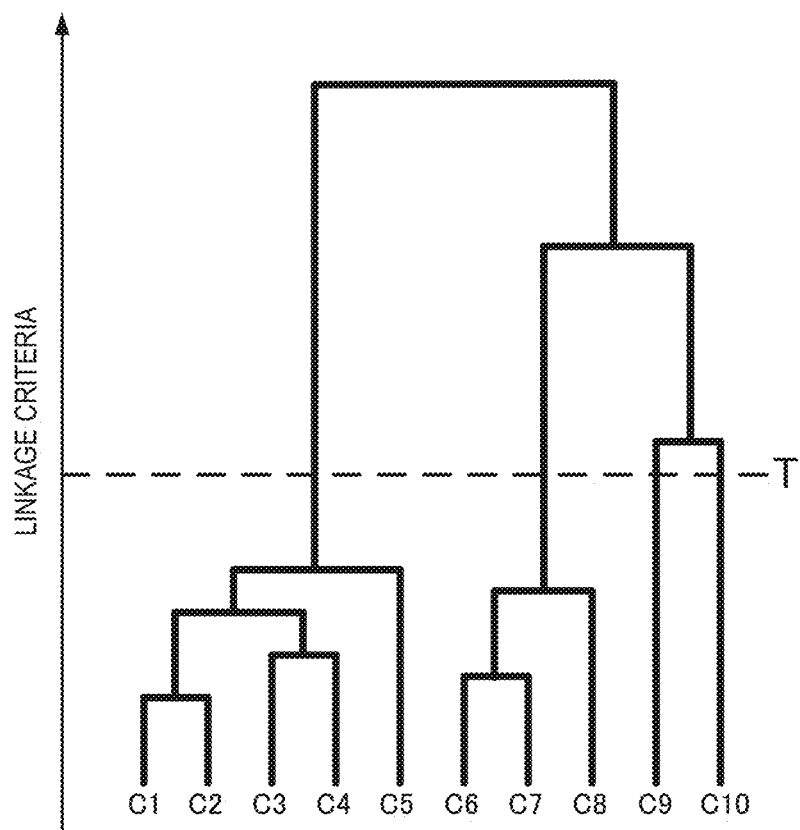
FIG. 4 is a diagram for describing a hierarchical clustering method.

FIGS. 3 and 4 are diagrams for describing the hierarchical clustering method.

As illustrated in FIGS. 3 and 4, the phase analysis unit 806 merges the minimum unit clusters C1, C2, C3, C4, C5, C6, C7, C8, C9, and C10 obtained from the self-organizing maps using the hierarchical clustering method to create new clusters.

Specifically, the phase analysis unit 806 obtains distances (dissimilarities) between the minimum unit clusters C1, C2, C3, C4, C5, C6, C7, C8, C9, and C10 and merges combinations thereof in descending order of the distance. A process of merging can be represented by a dendrogram. A distance required to merge two clusters is referred to as a linkage criterion.

As illustrated in FIG. 4, new clusters can be created by cutting the dendrogram at a threshold T. In the hierarchical clustering method, by adjusting the threshold T, any number of clusters can be created. In the illustrated example, by cutting the dendrogram at the threshold T, four clusters are created.

Figure 5:
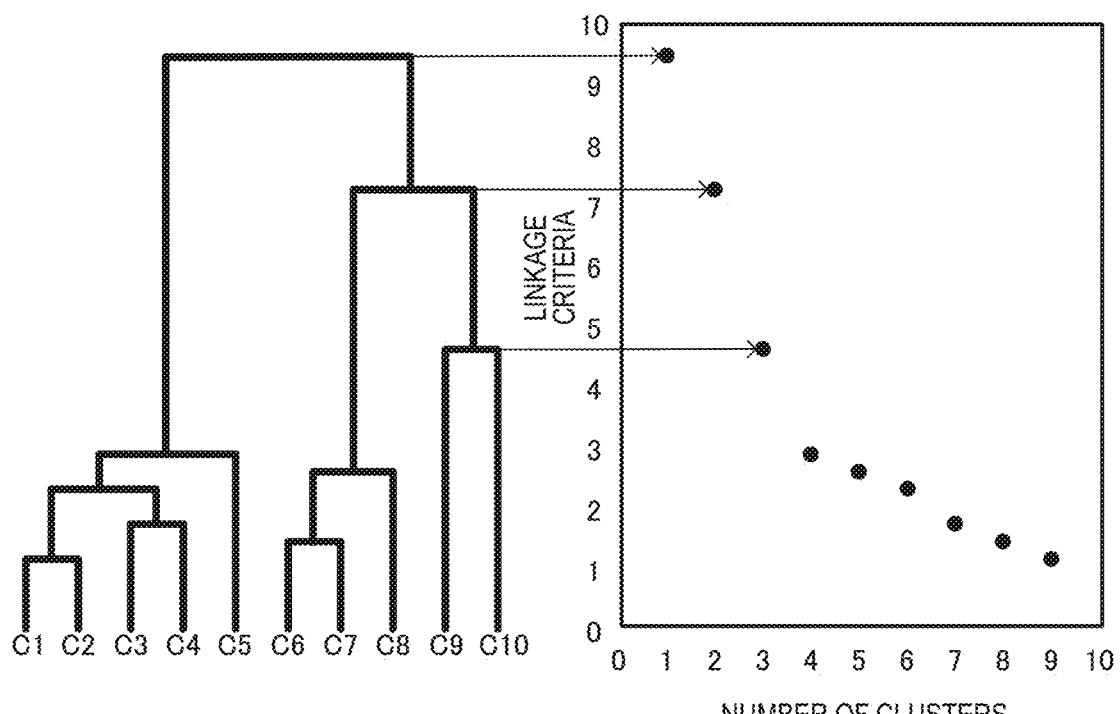
FIG. 5 is a graph illustrating a relationship between the number of clusters and linkage criteria.

FIG. 5 is a graph illustrating a relationship between the number of clusters and linkage criteria.

The phase analysis unit 806 obtains the linkage criteria between the minimum unit clusters C1, C2, C3, C4, C5, C6, C7, C8, C9, and C10 and creates the graph (function) indicating the relationship between the number of clusters and the linkage criteria illustrated in FIG. 5.

Figures 6, 7:
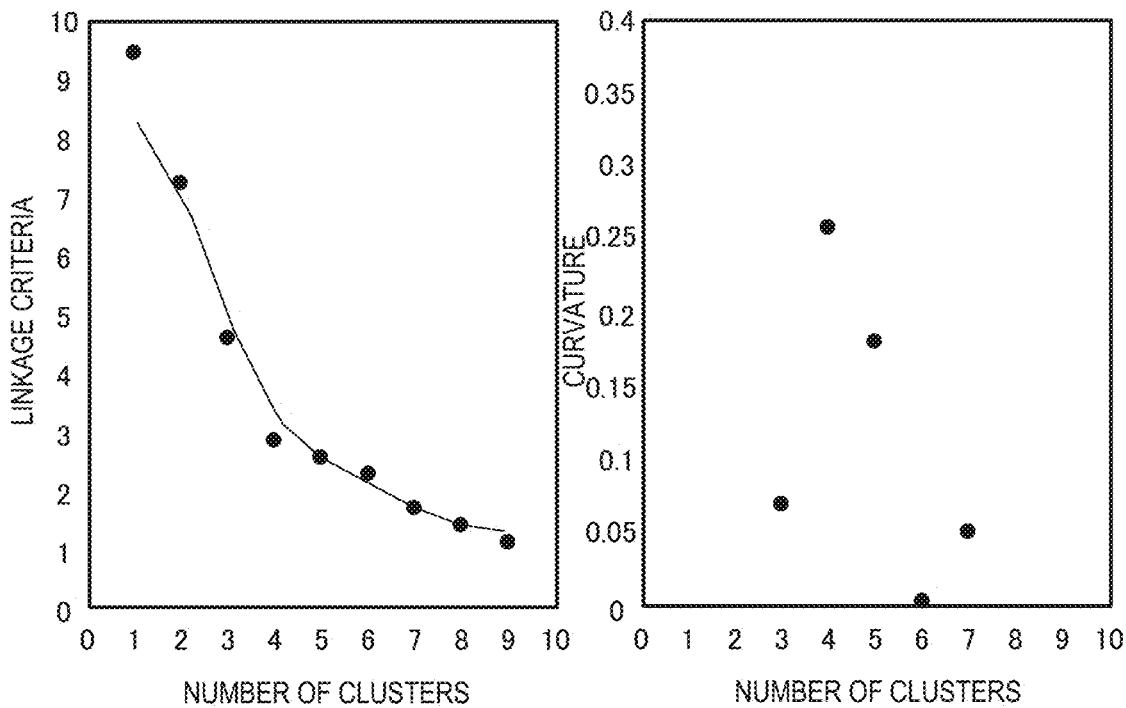
FIG. 6 is a graph illustrating a relationship between the number of clusters and curvatures.
FIG. 7 is a table for describing a first database.

FIG. 6 is a graph illustrating a relationship between the number of clusters and curvatures.

The phase analysis unit 806 creates the graph indicating the relationship between the number of clusters and the curvatures as illustrated in FIG. 6 from the graph indicating the relationship between the number of clusters and the linkage criteria as illustrated in FIG. 5. Here, the curvature is a curvature at an arbitrary point of the function showing the relationship between the number of clusters and the linkage criteria. A curvature R at a point (a, f(a)) of y=f(x) can be obtained by the following formula.

$$R = \frac{(1 + f'(a)^2)^{\frac{3}{2}}}{|f''(a)|}$$

The phase analysis unit 806 obtains the curvatures for each number of clusters and determines priority based on the curvatures. The priority can be expressed, for example, as a ratio of the largest curvature among the curvatures obtained for each number of clusters as a reference. The greater the curvature, the higher the priority.

In the example illustrated in FIG. 6, since the curvature is the largest when the number of clusters is "4," the number of clusters is determined to be "4." That is, the phase analysis unit 806 estimates the number of phases to be four.

The phase analysis unit 806 performs the phase analysis in accordance with the conditions for phase analysis and creates the phase maps as a result of the phase analysis. In the example illustrated in FIG. 6, since the number of phases is estimated to be four, the phase analysis unit 806 creates a phase map group consisting of four phase maps.

The phase analysis unit 806 further creates a phase spectrum from each phase map. A phase spectrum is a spectrum obtained by averaging (or integrating) spectra of all pixels that constitute a phase map. Further, the phase analysis unit 806 can perform a process of naming a phase for each phase map (labeling process), a process of obtaining an area fraction of each phase, a process of grouping edge phases, and the like. Each process performed by the phase analysis unit 806 will be described in detail below.

Labeling Process

A phase name is determined using two databases (a first database and a second database). Here, a case in which a compound name is used as a phase name will be described.

FIG. 7 is a table for describing the first database, and FIG. 8 is a table for describing the second database.

In the first database, as illustrated in FIG. 7, classification names (compound names), spectrum data, and quantitative results are registered. The first database may be created by registering acquired spectra by the user, or may be a publicly available or commercially available spectrum database. A classification name is a compound name assumed from a quantitative result. Spectrum data is data of a acquired X-ray spectrum. The quantitative result is a result of performing quantitative calculation on the acquired spectrum. For example, in the first database, as data No. 1, $SiO_2$ is registered as a classification name, $SiO_2$ spectrum data is registered as data of a spectral shape, and Si: 47.3269% and O: 52.6731% are registered as a quantitative result.

In the second database, as illustrated in FIG. 8, compound names and composition information are registered. Composition information is calculated from a compound name. For example, in the second database, as data No. 1, $SiO_2$ is registered as a compound name, and Si: 46.744559% and O: 53.255441% are registered as composition information.

The phase analysis unit 806 searches for, from the first database and the second database, data that has a high degree of matching with phase data (a phase spectrum and a quantitative result) serving as a naming target and a compound name of the data with a high degree of agreement is used as a phase name thereof.

Also, the phase analysis unit 806 may perform qualitative and quantitative analysis on phase spectra to obtain phase composition information and may name phases based on the composition information.

Area Fraction

The phase analysis unit 806 calculates an area fraction of each phase map. The area fraction can be expressed as a ratio of an area of each phase to an area of the entire map.

Process of Combining Edge Phases

In the phase map, there are cases where two phases cannot be separated at a boundary of the two phases and another phase seems to be present at the boundary between the two phases. Another phase present on the boundary between these two phases is referred to as an edge phase. This edge phase is not actually present, and thus in a case in which a plurality of edge phases are present, the plurality of edge phases are combined into one.

Figure 9:
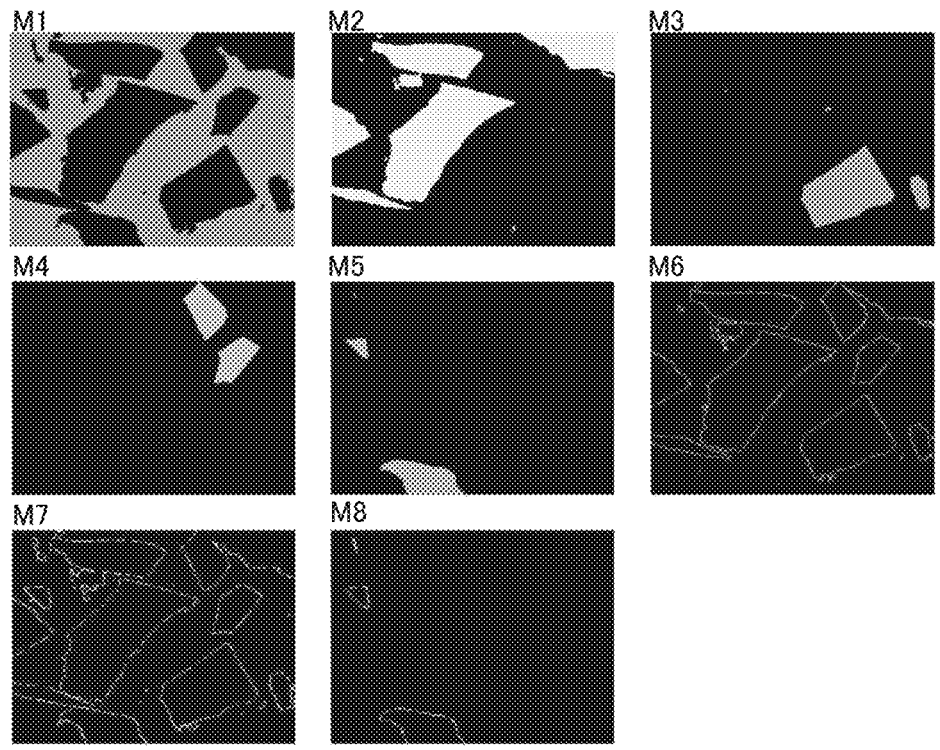
FIG. 9 is a diagram for describing a process of grouping edge phases.
Figure 9:
Figure 9:
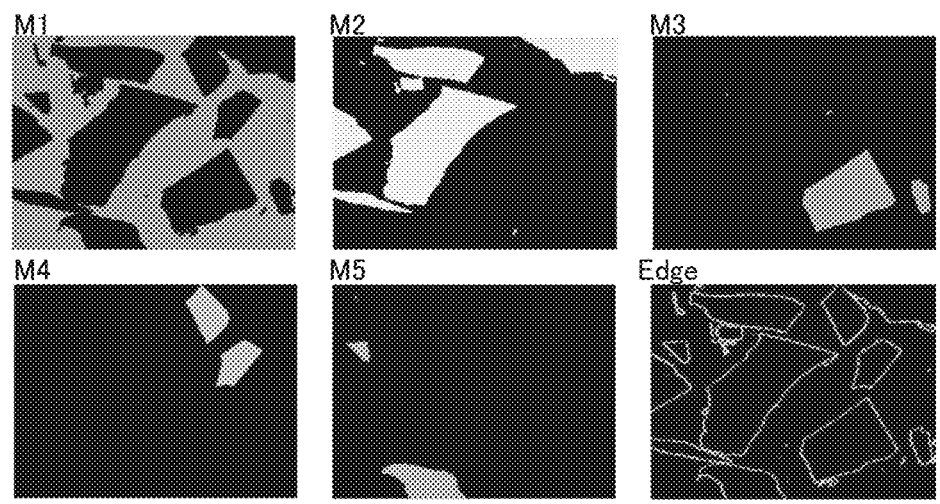

FIG. 9 is a diagram for describing a process of grouping edge phases. FIG. 9 illustrates a phase map M1 of a first phase, a phase map M2 of a second phase, a phase map M3 of a third phase, a phase map M4 of a fourth phase, a phase map M5 of a fifth phase, a phase map M6 of a sixth phase, a phase map M7 of a seventh phase, and a phase map M8 of an eighth phase.

Here, the sixth phase and the seventh phase indicate edges of the first phase. Also, the eighth phase indicates edges of the fifth phase. For that reason, the phase map M6 of the sixth phase, the phase map M7 of the seventh phase, and the phase map M8 of the eighth phase are combined to create a phase map Edge. Thus, a plurality of edge phases can be combined into one phase map.

The phase analysis unit 806 determines edge phases from a plurality of phase maps that constitute a phase map group. Here, a case in which determination is made by focusing on the characteristic that pixels of other phases are often present around pixels of edge phases will be described.

Figure 10:
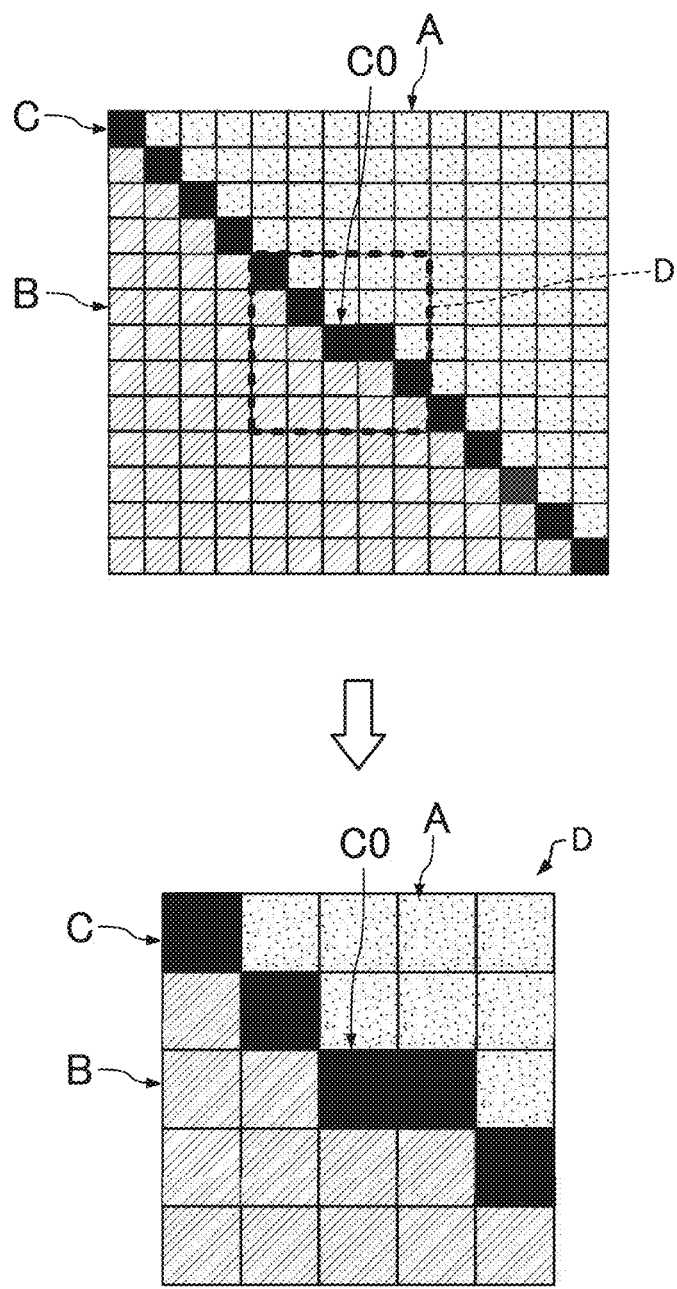
FIG. 10 is a diagram for describing a method for determining edge phases.

FIG. 10 is a diagram for describing a method for determining an edge phase. A phase A, a phase B, and a phase C are illustrated in FIG. 10. Here, a case of determining whether or not the phase C is an edge phase will be described.

Focusing on one pixel C0 of pixels belonging to phase C, data of the region D around the pixel C0 is cut out. In the illustrated example, the region D is a 5×5 region. A size of the cutout region D can be set, for example, on a preview screen, which will be described later.

Next, the number of pixels in each phase included in the region D is counted. In the example illustrated in FIG. 10, the phase A has 8 pixels, the phase B has 12 pixels, and the phase C has 5 pixels.

Next, it is determined whether a phase with the largest number of pixels matches a phase of the pixel C0. In a case in which they do not match each other, the pixel C0 is determined to be an edge-like pixel. In a case in which they match each other, the pixel C0 is not determined to be an edge-like pixel. Here, since the phase with the largest number of pixels does not match the phase of the pixel C0, the pixel C0 is determined to be an edge-like pixel.

The process of cutting out the region D, the process of counting the number of pixels, and the process of determining whether or not the phase with the largest number of pixels matches the phase of the pixel of interest is performed for all pixels belonging to the phase C. Then, a proportion between the total number of pixels belonging to the phase C and the number of pixels determined to be edge-like pixels is calculated. As a result, in a case in which the proportion exceeds a threshold, the phase C is determined as an edge phase. On the other hand, in a case in which the proportion is equal to or less than the threshold, the phase C is not determined to be an edge phase. The threshold can be set on a preview screen, which will be described later.

Here, the case of determining whether or not the phase C is an edge phase has been described, but a process of determining whether or not all phases are edge phases is performed. As a result, the edge phases can be extracted from the phase map group.

Also, the method for determining the edge phase is not limited thereto. For example, it may be determined whether or not a phase is an edge phase from a phase shape, or whether or not it is an edge phase may be determined from a phase spectrum.

2.4. Display 2.4.1. Display of Analysis Screen

The display control unit 808 displays the phase analysis results performed by the phase analysis unit 806 on an analysis screen (an example of the first screen). The analysis screen is displayed on the display unit 820.

Figure 11:
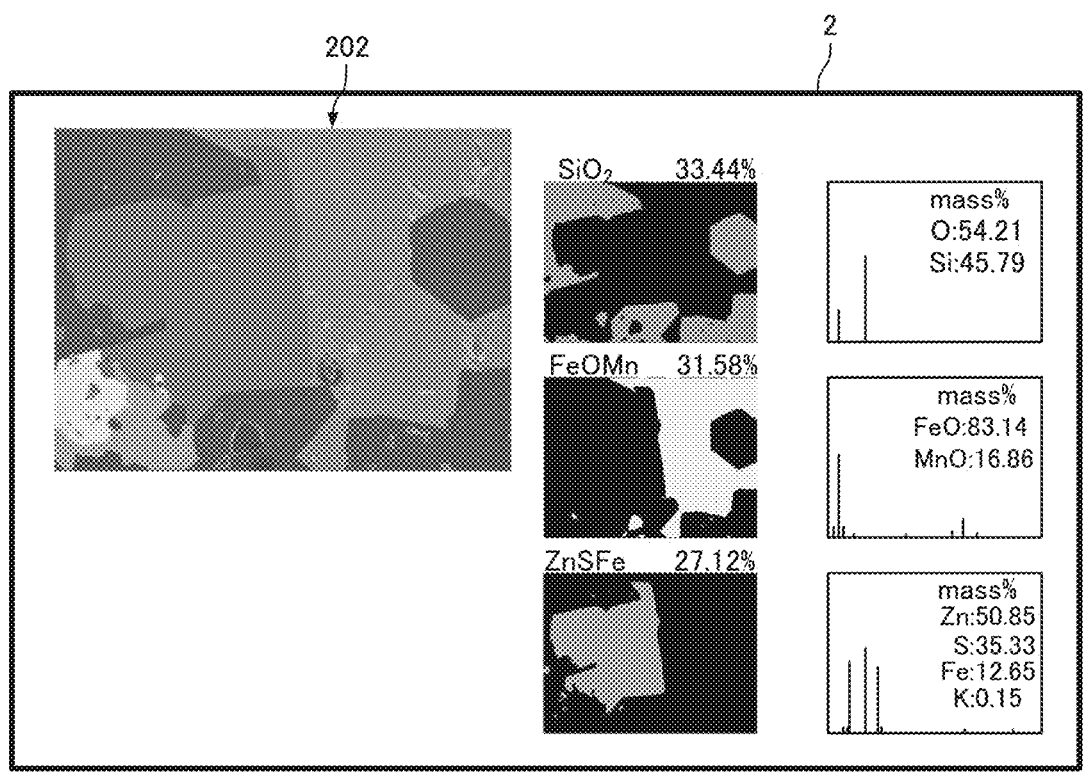
FIG. 11 is a diagram illustrating an example of an analysis screen.

FIG. 11 is a diagram illustrating an example of an analysis screen 2 (a GUI screen).

A plurality of phase maps and phase spectra are displayed on the analysis screen 2. The analysis screen 2 also displays names of each phase, area fractions of each phase, and quantitative results thereof. Further, in a region 202 of the analysis screen 2, an image obtained by synthesizing each phase map and SEM image is displayed.

On the analysis screen 2, it is possible to analyze and edit the phase analysis results. For example, on the analysis screen 2, qualitative and quantitative analysis of phase spectra, phase combining, phase color changes, phase name changes, and the like can be performed.

On the analysis screen 2, qualitative and quantitative analysis of phase spectra can be performed under various conditions. By performing qualitative and quantitative analysis of phase spectra, phases can be renamed and compared to other phases.

On the analysis screen 2, a plurality of phase maps can be combined to form one phase map. For example, phase maps with similar distributions can be combined into one phase map, or a plurality of phases with similar compositions can be combined into one phase. Also, a plurality of edge phases can be combined into one phase map.

On the analysis screen 2, colors of phase maps selected by the user can be changed to desired colors. This makes it easier to see the phase maps.

Also, on the analysis screen 2, phase names can be changed. For example, phase names may be changed based on results of the qualitative and quantitative analysis of phase spectra.

2.4.2. Display of Preview Screen

The display control unit 808 displays a preview screen (an example of the second screen) along with the analysis screen 2. For example, in a case in which the user changes the phase analysis conditions after analyzing and editing the phase analysis results on the analysis screen 2, the conditions can be changed on the preview screen. Also, on the preview screen, results of the phase analysis performed under the changed conditions are displayed.

On the preview screen 4, change of the conditions and confirmation of the results of the phase analysis performed under the changed conditions are repeatedly performed, and in a case in which appropriate phase analysis results are obtained, the phase analysis results displayed on the preview screen 4 can be applied to the analysis screen 2.

Figure 12:
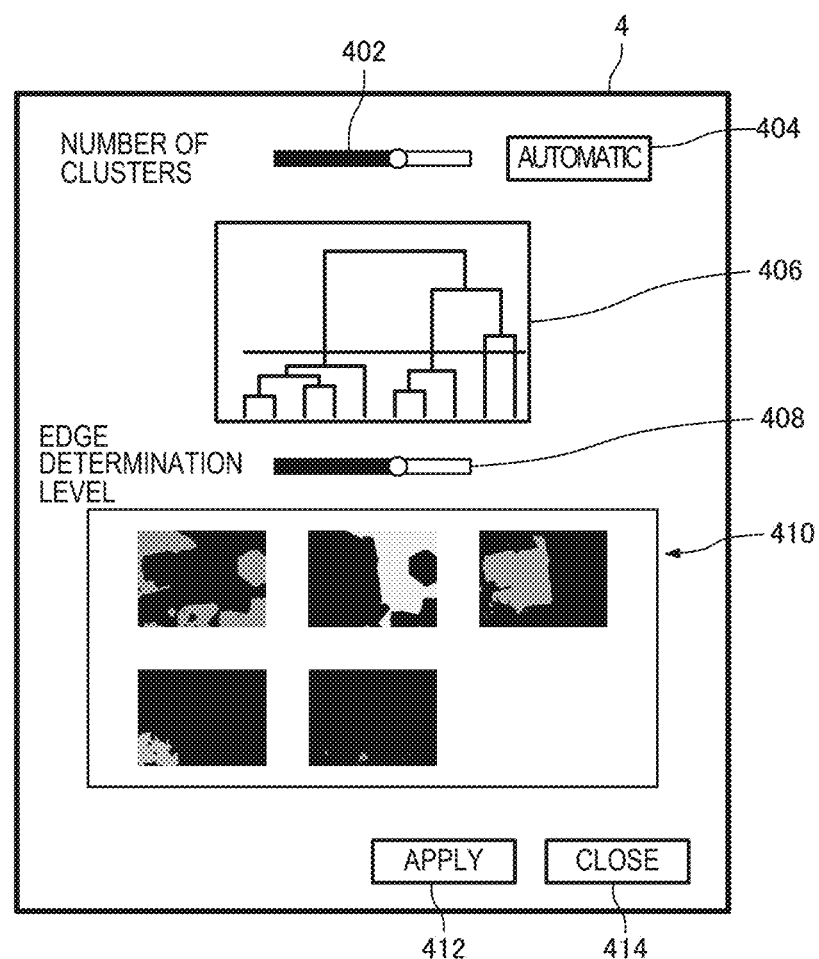
FIG. 12 is a diagram illustrating an example of a preview screen.

FIG. 12 is a diagram illustrating an example of the preview screen 4.

On the preview screen 4, a slider 402 for the user to set the number of clusters (number of phases), a button 404 for automatically setting the number of clusters, an information display region 406 in which information for setting the number of clusters is displayed, a slider 408 for setting an edge determination level (region D) in the process of determining the edge phases, an analysis result display region 410 in which phase maps as a result of the phase analysis are displayed, an apply button 412, and a close button 414 are displayed.

The slider 402 is a GUI component for the user to set the number of clusters. Also, the GUI component for setting the number of clusters is not limited to the slider 402.

The button 404 is a GUI component for causing the phase analysis unit 806 to set the number of clusters. By pressing the button 404, the number of clusters is set to the number of clusters estimated by the phase analysis unit 806.

Information for estimating the number of phases (number of clusters) is displayed in the information display region 406. In the illustrated example, a dendrogram showing a process of merging clusters using the hierarchical clustering method is displayed. By checking the dendrogram, the number of clusters can be estimated. For example, a line indicating the threshold T corresponding to the number of clusters set with the slider 402 may be displayed on the dendrogram.

Also, the information displayed in the information display region 406 is not limited to the dendrogram. For example, the information display region 406 may display a graph indicating the relationship between the linkage criteria and the number of clusters illustrated in FIG. 5. Also, the information display region 406 may display both of the dendrogram and the graph indicating the relationship between the linkage criteria and the number of clusters.

Also, the information display region 406 may not be displayed on the preview screen 4. For example, the information display region 406 may be displayed on a screen other than the preview screen 4.

The slider 408 is a GUI component for setting the edge determination level, that is, for setting the region D in the above-described process for determining the edge phases. Also, the GUI component for setting the edge determination level (region D) is not limited to the slider 408.

On the preview screen 4, as described above, the number of clusters can be set with the slider 402, and the edge determination level can be set with the slider 408. In this way, on the preview screen 4 illustrated in FIG. 12, the phase analysis conditions that affect the number of phases can be changed.

Although not shown, the preview screen 4 may display a GUI component for setting a threshold in the process of determining the edge phases.

The analysis result display region 410 is a region for displaying the phase analysis results. In the illustrated example, phase maps are displayed. Also, in addition to the phase maps, the analysis result display region 410 may display phase spectra, results of qualitative and quantitative analysis (composition information), phase name information (compound names), and the like. These pieces of information may be displayed near the phase maps, or displayed using tooltips on the phase maps.

On the preview screen 4, the phase analysis conditions can be changed by using the slider 402 to change the number of clusters, and by using the slider 408 to change the edge determination level (region D). In this case, the display control unit 808 changes the phase analysis results displayed in the analysis result display region 410 of the preview screen 4 without changing the phase analysis results displayed on the analysis screen 2. That is, the analysis screen 2 displays the phase analysis results from before the conditions are changed, and the preview screen 4 displays the phase analysis results from after the conditions are changed.

The apply button 412 is a GUI component for applying the phase analysis results displayed on the preview screen 4 to the analysis screen 2. The user presses the apply button 412 via the operation unit 810, and thus the phase analysis results displayed on the preview screen 4 are reflected on the analysis screen 2. That is, the results of the phase analysis performed under the changed conditions displayed on the preview screen 4 are displayed on the analysis screen 2. As a result, analysis and editing of the phase analysis results can be performed on the analysis screen 2.

The operation of pressing the apply button 412 has been performed here as an operation for applying the phase analysis displayed on the preview screen 4 to the analysis screen 2, the operation for applying the phase analysis displayed on the preview screen 4 to the analysis screen 2 is not particularly limited.

The close button 414 is a GUI component for closing the preview screen 4 (a window displaying the preview screen 4). By performing an operation of pressing the close button 414, the preview screen 4 is closed and the phase analysis results are discarded.

3. OPERATIONS

In the phase analyzer 80, the analysis screen 2 and the preview screen 4 can be used to analyze and edit the phase analysis.

When the sample analyzer 100 collects signals from the sample S, and generates the spectrum imaging data, the data acquisition unit 802 acquires the spectrum imaging data.

The phase analysis unit 806 performs the phase analysis by performing multivariate analysis on the spectrum imaging data. For example, the phase analysis unit 806 creates the self-organizing maps of the spectrum imaging data and creates the minimum unit clusters. Next, the phase analysis unit 806 creates new clusters by merging the minimum unit clusters using the hierarchical clustering method. In this case, the phase analysis unit 806 estimates the number of clusters (the number of phases) based on the curvatures of the function indicating the relationship between the number of clusters and the linkage criteria as illustrated in FIG. 6.

The phase analysis unit 806 creates the phase map group consisting of the number of phase maps corresponding to the estimated number of phases. The phase analysis unit 806 obtains the compound names (phase names), the area fractions, and the phase spectra in addition to the phase map group. Further, the phase analysis unit 806 performs the qualitative and quantitative analysis on the phase spectra.

As illustrated in FIG. 11, the display control unit 808 causes the display unit 820 to display the analysis screen 2 on which the phase analysis results are displayed. In the example illustrated in FIG. 11, the display control unit 808 causes the analysis screen 2 to display the phase maps, the phase spectra, the quantitative results, and the compound names (phase names) as the phase analysis results.

On the analysis screen 2, it is possible to analyze and edit the phase analysis results. For example, on the analysis screen 2, qualitative and quantitative analysis of phase spectra, phase combining, change of colors of phases, and change of phase names can be performed.

Here, in a case in which that the phase analysis results are determined to be inappropriate as a result of the user confirming the phase analysis results on the analysis screen 2, or as a result of analyzing and editing the phase analysis results, it is required to change the phase analysis conditions and perform new phase analysis. For example, in the phase analysis, if the number of phases set is not appropriate, appropriate phase maps cannot be obtained.

In the case of changing the conditions for the number of phases, although not shown, when the user operates a GUI component for opening the preview screen 4 on the analysis screen 2 via the operation unit 810, the display control unit 808 causes the display unit 820 to display the preview screen 4 illustrated in FIG. 12. In this case, the same phase analysis results as the phase analysis results displayed on the analysis screen 2 are displayed in the analysis result display region 410 of the preview screen 4.

Also, in the above description, the display control unit 808 has caused the preview screen 4 to be displayed when the user performs the operation to open the preview screen 4, but the display control unit 808 may display the preview screen 4 simultaneously with the analysis screen 2.

The information for setting the number of phases (the number of clusters) is displayed in the information display region 406 of the preview screen 4. In the example illustrated in FIG. 12, the information display region 406 displays the dendrogram showing the process of merging the clusters by the hierarchical clustering method. The user can check the dendrogram displayed in the information display region 406 and estimate the number of clusters.

When the user operates the slider 402 via the operation unit 810 to change the number of clusters, the condition reception unit 804 receives the operation for changing the number of clusters.

The phase analysis unit 806 performs the phase analysis based on the information on the number of clusters received by the condition reception unit 804 and generates the phase map group configured of the number of phase maps corresponding to the number of clusters. Also, the phase analysis unit 806 obtains the compound names, the area fractions, and the phase spectra and performs the qualitative and quantitative analysis on the phase spectra.

The display control unit 808 displays the results of the phase analysis performed under the changed conditions of the number of phases on the preview screen 4 and updates the preview screen 4. For that reason, the analysis screen 2 displays the phase analysis results (results of a first phase analysis) before the conditions of the number of phases are changed, and the preview screen 4 displays the phase analysis results from after the conditions of the number of phases are changed (the results of a second phase analysis).

When the user again operates the slider 402 via the operation unit 810 to change the number of clusters, the condition reception unit 804, the phase analysis unit 806, and the display control unit 808 repeat the above processes, and the results of the phase analysis performed under the changed conditions for the number of phases are displayed on the preview screen 4. For that reason, the analysis screen 2 displays the phase analysis results from before the conditions for the number of phases are changed (results of the first phase analysis), and the preview screen 4 displays the phase analysis results from after the conditions of the number of phases are changed (results of a third phase analysis).

In a case in which the user determines that the results of the third phase analysis are appropriate, the user presses the apply button 412 via the operation unit 810. Thus, the display control unit 808 causes the analysis screen 2 to display the results of the third phase analysis and updates the analysis screen 2. Since the analysis screen 2 displays the results of the third phase analysis, the results of the third phase analysis can be analyzed and edited.

In addition, in a case in which the user determines that the results of the first phase analysis are appropriate after the results of the third phase analysis are confirmed, the user performs the operation of pressing the close button 414 via the operation unit 810. Since the results of the first phase analysis are displayed on the analysis screen 2, it is possible to analyze and edit the results of the first phase analysis.

Also, although the case of changing the number of phases has been described above, the phase analyzer 80 operates in the same way when changing the edge determination level (region D). Further, the preview screen 4 may be provided with a GUI component for changing other phase analysis conditions (smoothing, pixel binning, normalization of spectral intensity, parameters in a process of combining phases, etc.). In this case, the phase analyzer 80 operates in the same way as for changing the number of phases described above.

4. EFFECTS

The phase analyzer 80 includes the data acquisition unit 802 that acquires the spectrum imaging data, the phase analysis unit 806 that performs the phase analysis based on the spectrum imaging data, the display control unit 808 that displays the phase analysis results on the analysis screen 2, and the condition reception unit 804 that receives the operation for changing the phase analysis conditions. In addition, in the phase analyzer 80, the phase analysis unit 806 performs the phase analysis under the changed phase analysis conditions when the condition reception unit 804 receives the operation for changing the phase analysis conditions, the display control unit 808 causes the preview screen 4 to display the results of the phase analysis performed under the changed phase analysis conditions, and in a case in which a predetermined operation is performed, it reflects the phase analysis results displayed on the preview screen 4 on the analysis screen 2.

For that reason, in the phase analyzer 80, the phase analysis results from before the conditions are changed can be displayed on the analysis screen 2 and the phase analysis results from after the conditions are changed can be displayed on the preview screen 4. Accordingly, in the phase analyzer 80, even if the conditions are repeatedly changed, the phase analysis results from before the conditions are changed can be easily confirmed. As a result, for example, the original phase analysis results can be easily reproduced even if the conditions are repeatedly changed.

Here, in order to determine optimum conditions for the phase analysis (number of phases, etc.), it is required to repeat performing the phase analysis under different conditions, creating the phase analysis results, and determining whether or not the results are appropriate. In some cases, whether or not the created phase analysis results are appropriate can be easily determined by visually observing the phase analysis results, and in some cases, it may not be determined unless the phase analysis results are analyzed and edited. As the number of phases increases, an amount of work involved in analysis and editing increases, and phases with complex compositions require a lot of labor, such as confirming the results of qualitative and quantitative analysis.

For example, after the analysis and the editing are performed, the phase analysis may be performed under different conditions, but no reasonable results may be obtained, and it can be determined that the initial conditions were optimal. In such a case, conventionally, in order to confirm the initial conditions, it was required to perform the same operations as the initial ones (condition setting, analysis, and editing).

On the other hand, in the phase analyzer 80, change of the conditions and the phase analysis results from after the conditions are changed are displayed on the preview screen 4, and the phase analysis results from before the conditions are changed are displayed on the analysis screen 2, and thus the phase analysis results from before the conditions are changed can be easily reproduced.

In the phase analyzer 80, the phase analysis unit 806 performs the phase analysis using the cluster analysis, and the display control unit 808 displays the dendrogram obtained by the cluster analysis on the preview screen 4. For that reason, the phase analyzer 80 allows the user to logically estimate the number of phases.

5. MODIFIED EXAMPLES

5.1. First Modified Example

In the above-described embodiment, the phase analysis unit 806 creates both the phase maps and the phase spectra when the phase analysis conditions are changed, but the phase spectra may not be created while the preview screen 4 is displaying the phase analysis results, and the phase spectra may be created after the apply button 412 is pressed.

In this case, the phase maps are displayed on the preview screen 4, but the phase spectra are not displayed. The phase analysis unit 806 creates the phase spectra at a timing when the apply button 412 on the preview screen 4 is pressed, and the display control unit 808 displays the created phase spectra on the analysis screen 2 together with the phase maps.

5.2. Second Modified Example

In the above-described embodiment, the phase analysis unit 806 estimates the number of phases (number of clusters) using the cluster analysis, and the display control unit 808 causes the information display region 406 of the preview screen 4 to display the dendrogram obtained by the cluster analysis.

On the other hand, for example, the phase analysis unit 806 may estimate the number of phases using principal component analysis, and the display control unit 808 may cause the information display region 406 of the preview screen 4 to display a scree plot created in the process of performing the principal component analysis.

Figure 13:
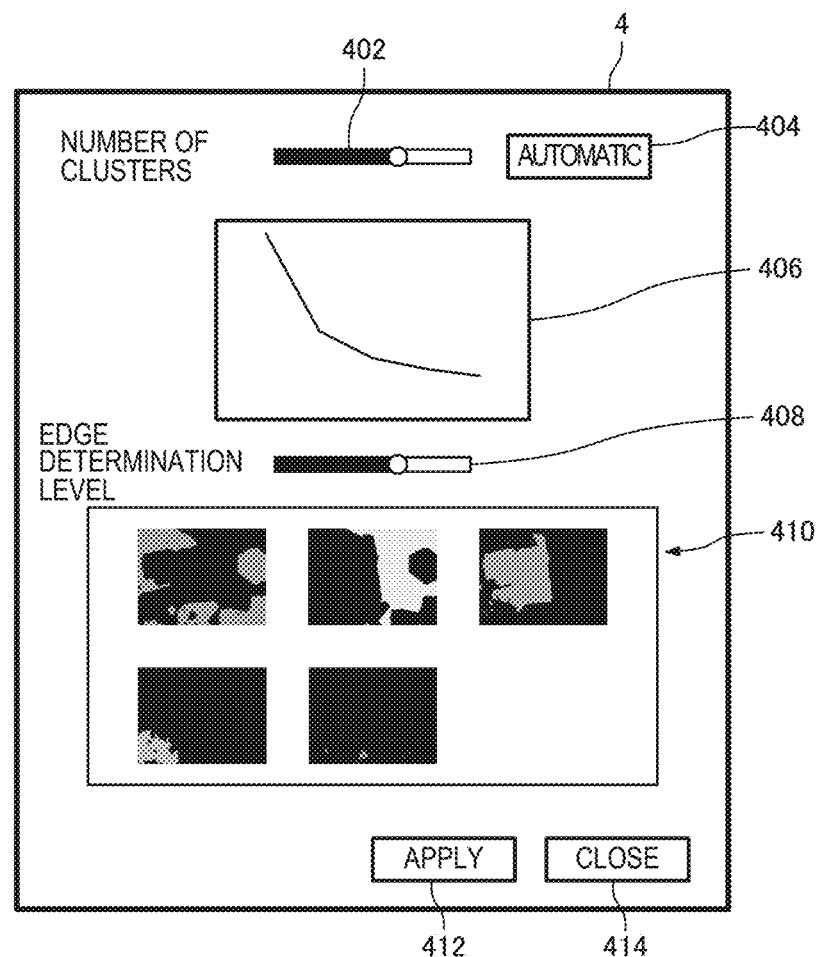
FIG. 13 is a diagram illustrating an example of a preview screen.

FIG. 13 is a diagram illustrating an example of the preview screen 4.

A scree plot is one of methods used to estimate the appropriate number of phases (number of components) in the principal component analysis. The scree plot is a graph obtained by plotting calculated principal components and their eigenvalues (variances) by executing the principal component analysis. The user can estimate the appropriate number of phases from a relationship between the number of phases and the eigenvalues.

In the phase analyzer 80, the phase analysis unit 806 performs the phase analysis using the principal component analysis, and a display control unit 808 displays the scree plot obtained by the principal component analysis on the preview screen 4. For that reason, the phase analyzer 80 allows the user to logically estimate the number of phases.

Also, the phase analysis unit 806 may perform the phase analysis using singular value decomposition, non-negative matrix decomposition, or vertex component analysis, and the display control unit 808 may display the scree plot obtained by the principal component analysis.

5.3. Third Modified Example

In the above-described embodiment, the phase analysis unit 806 has determined the number of clusters (the number of phases) from the graph indicating the relationship between the number of clusters and the curvatures illustrated in FIG. 6, but the phase analysis unit 806 may determine cluster number candidates from the graph illustrated in FIG. 6.

Figure 14:
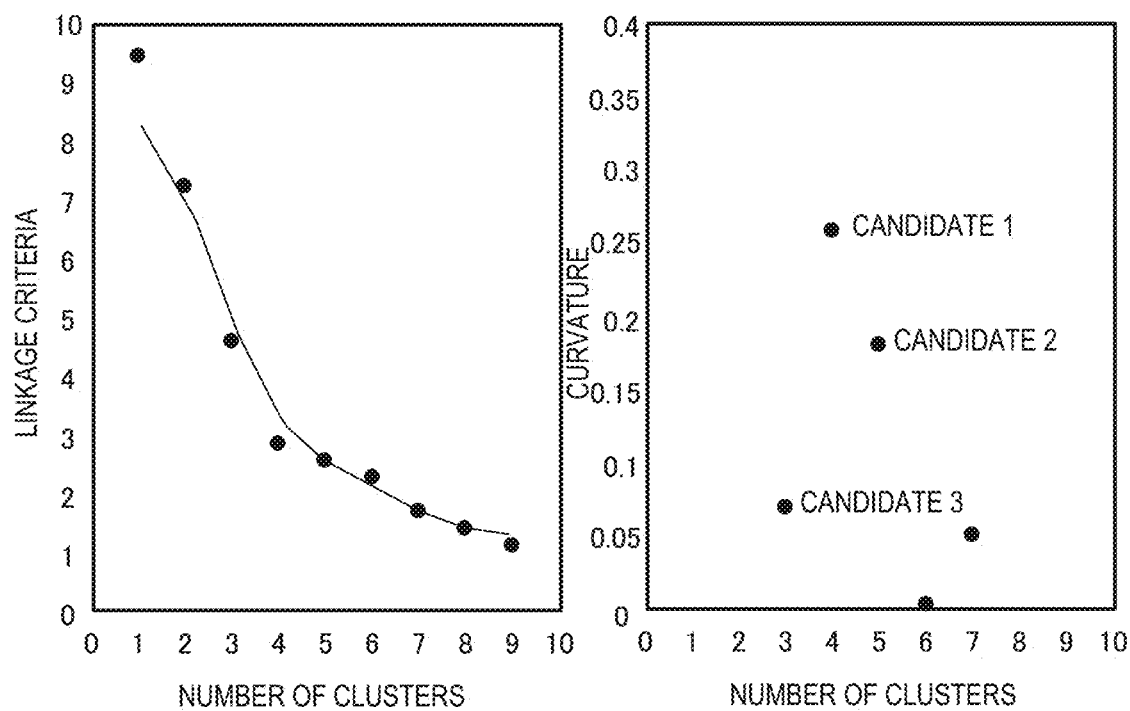
FIG. 14 is a diagram for describing a process of determining candidates for the number of clusters.

FIG. 14 is a diagram for describing the process of determining candidates for the number of clusters. FIG. 14 illustrates a graph indicating the relationship between the number of clusters and the curvatures.

For example, the phase analysis unit 806 obtains the curvature for each number of clusters and determines the priority based on the curvature. The priority is expressed, for example, as the ratio of the largest curvature among the curvatures obtained for each number of clusters. The greater the curvature, the higher the priority.

In the example illustrated in FIG. 14, since the curvature is the largest in a case in which the number of clusters is "4," it has the highest priority and is selected as a candidate 1. Also, since the curvature is the second largest in a case in which the number of clusters is "5," it has the second highest priority and is selected as a candidate 2. In addition, since the curvature is the third largest in a case in which the number of clusters is "3," it has the third highest priority and is selected as a candidate 3.

From these results, the phase analysis unit 806 determines the case in which the number of phases is 4, the case in which the number of phases is 5, and the case in which the number of phases is 3 as candidates.

Here, the phase analysis unit 806 determines only the number of clusters with higher priority than a preset reference value of priority as candidates. For that reason, the case in which the number of clusters is "7" has the fourth largest curvature, but the priority is lower than the preset reference value, and thus it is excluded from the candidates.

Also, the phase analysis unit 806 may list a preset number of candidates for the number of phases. That is, in a case in which the number of candidates is set to three in advance, the phase analysis unit 806 lists three candidates for the number of phases in descending order of priority.

The phase analysis unit 806 creates phase map groups consisting of the number of phase maps corresponding to the determined number of phases for each candidate of the determined number of phases.

The display control unit 808 displays the number of phases and the phase map groups on a candidate list screen (an example of a third screen) for each candidate for the number of phases. The display control unit 808 displays the phase map groups in descending order of priority.

Figure 15:
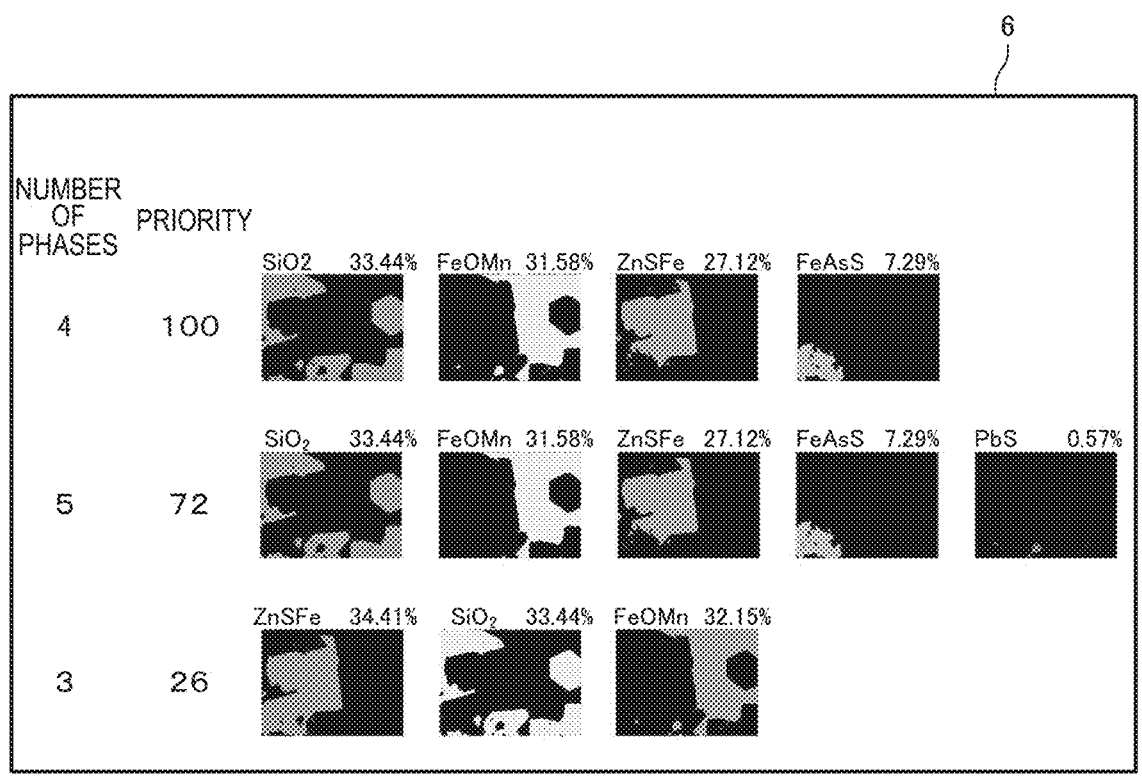
FIG. 15 is a diagram illustrating an example of a candidate list screen.

FIG. 15 is a diagram illustrating an example of a candidate list screen 6 for displaying phase map group candidates.

The display control unit 808 displays the phase analysis results performed by the phase analysis unit 806 described above on the candidate list screen 6 illustrated in FIG. 15.

The candidate list screen 6 illustrated in FIG. 15 displays a phase map group in which the number of phases is four, a phase map group in which the number of phases is five, and a phase map group in which the number of phases is three. These three phase map groups are arranged in descending order of priority.

In addition, the display control unit 808 displays the compound names (phase names) and each area fraction. As the compound names, compound names determined by the phase analysis unit 806 or compound names input by the user are displayed. Although not shown, the candidate list screen 6 may display information for the user to select phase map groups, such as phase spectra, a dendrogram, and the like, in addition to the above-described phase names and area fractions.

Figure 16:
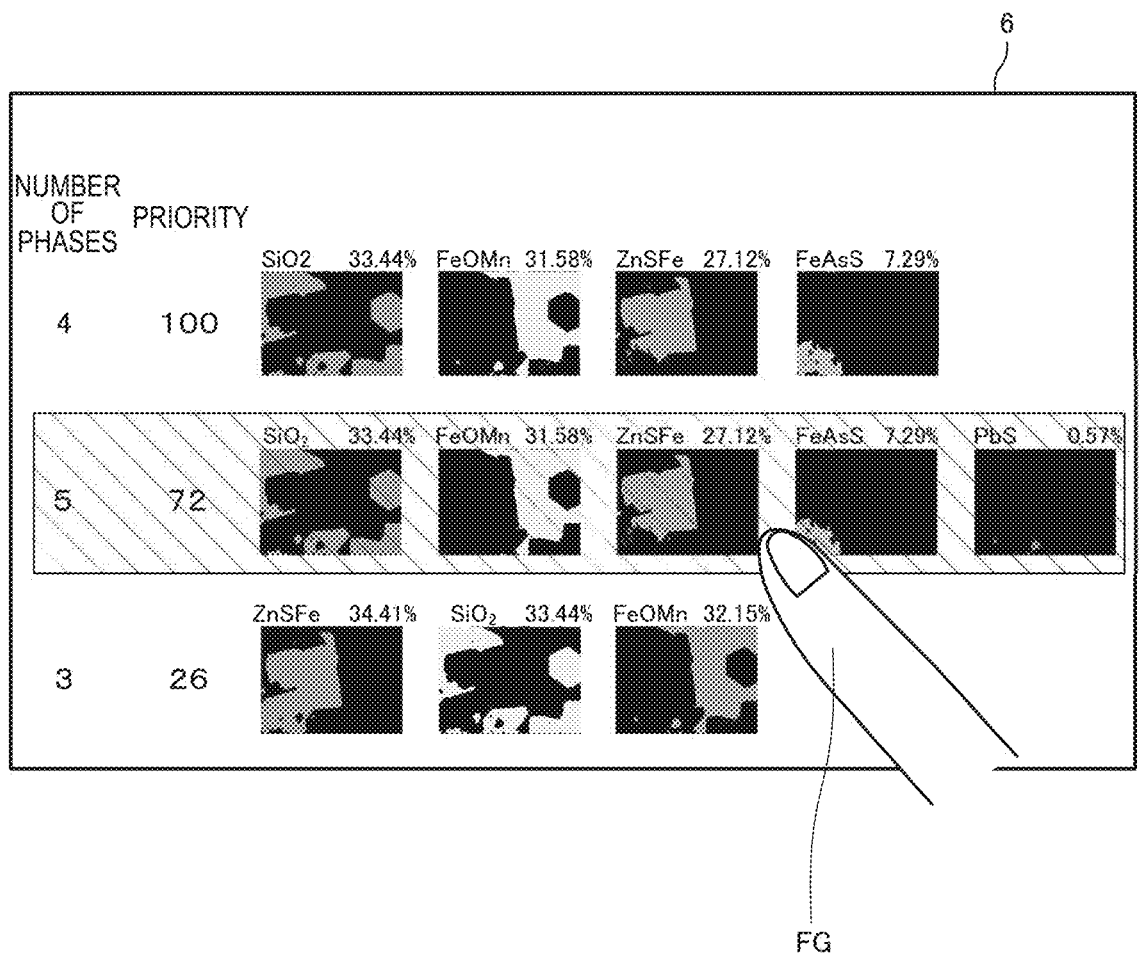
FIG. 16 is a diagram schematically illustrating a state in which one phase map group is selected on a candidate list screen.

FIG. 16 is a diagram schematically illustrating a state in which one phase map group is selected on the candidate list screen 6.

On the candidate list screen 6, the user can select one phase map group from a plurality of phase map group candidates displayed. For example, in a case in which the display unit 820 includes a touch panel (an example of the operation unit 810), the user performs an operation of touching a desired phase map group with a fingertip FG, so that the user can select one phase map group from the plurality of phase map groups displayed on the candidate list screen 6. Also, the phase map group may be selected by operating a mouse or keyboard.

When the phase map group is selected, the display control unit 808 causes the analysis screen 2 to display the selected phase map group (phase analysis results).

The operation after the display control unit 808 causes the analysis screen 2 to display the phase analysis results is the same as in the above-described embodiment, and the description thereof will be omitted.

As described above, the phase analysis unit 806 performs the multivariate analysis on the spectrum imaging data to determine candidates for the number of phases and creates phase map groups consisting of the number of phase maps corresponding to the number of phases for each candidate, and the display control unit 808 displays the phase map groups on the candidate list screen 6 for each candidate. For that reason, the phase analyzer 80 can determine the candidates for the number of phases and can cause the display unit 820 to display the phase map groups configured of the number of phase maps corresponding to the number of phases for each candidate for the number of phases. Accordingly, the user can easily obtain favorable phase map groups.

In addition, in the phase analyzer 80, the phase analysis unit 806 obtains the priority of the number of phases based on the results of the multivariate analysis and determines the candidates for the number of phases based on the priority. For that reason, the phase analyzer 80 does not require the user to specify the number of phases.

5.4. Fourth Modified Example

In the above-described embodiments, the case in which the sample analyzer 100 is a scanning electron microscope equipped with the X-ray detector 70 has been described, but the analyzer according to the invention is not limited thereto. For example, the analyzer according to the invention may be any device that can obtain spectra based on signals (X-rays, electrons, ions, etc.) from the sample S. The analyzer according to the invention is a transmission electron microscope equipped with an energy-dispersive X-ray spectrometer or a wavelength-dispersive X-ray spectrometer, an electron probe microanalyzer, an Auger microprobe, a photoelectron spectrometer, a focused ion beam device, or the like.

Also, the above-described embodiments and modified examples are merely examples, and the invention is not limited thereto. For example, the embodiments and modified examples can be combined as appropriate.

The invention is not limited to the above-described embodiments, and various modifications are possible. For example, the invention includes configurations that are substantially the same as the configurations described in the embodiments. Substantially same configurations mean configurations having the same functions, methods and results, or configurations having the same objectives and effects as those of the configurations described in the embodiments, for example. The invention also includes configurations obtained by replacing non-essential elements of the configurations described in the embodiments with other elements. The invention also includes configurations having the same effects as those of the configurations described in the embodiments, or configurations capable of achieving the same objectives as those of the configurations described in the embodiments. The invention further includes configurations obtained by adding known art to the configurations described in the embodiments.

As described above, some embodiments of the invention have been described in detail, but a person skilled in the art will readily appreciate that various modifications can be made from the embodiments without materially departing from the novel teachings and effects of the invention. Accordingly, all such modifications are assumed to be included in the scope of the invention.

The invention claimed is:

1. A phase analyzer comprising:
   a data acquisition unit configured to acquire spectrum imaging data in which a position on a sample is associated with a spectrum of a signal from the sample;
   a phase analysis unit configured to perform phase analysis based on the spectrum imaging data;
   a display control unit configured to display results of the phase analysis on a first screen; and
   a condition reception unit configured to receive an operation for changing a condition for the phase analysis,
   when the condition reception unit has received the operation for changing the condition, the phase analysis unit performing phase analysis under the changed condition,
   the display control unit displaying on a second screen the results of the phase analysis performed under the changed condition, and
   when a predetermined operation has been performed, the display control unit reflecting on the first screen the results of the phase analysis displayed on the second screen,
   wherein the condition is the number of phases.

2. The phase analyzer according to claim 1, wherein the results of the phase analysis comprise a phase map.

3. The phase analyzer according to claim 1, wherein
   the phase analysis unit performs the phase analysis by using cluster analysis, and
   the display control unit displays on the second screen a dendrogram obtained by the cluster analysis.

4. The phase analyzer according to claim 1, wherein
   the phase analysis unit performs the phase analysis by using principal component analysis, and
   the display control unit displays on the second screen a scree plot obtained by the principal component analysis.

5. The phase analyzer according to claim 1, wherein
   the phase analysis unit performs multivariate analysis on the spectrum imaging data to determine candidates for the number of phases,
   the phase analysis unit creates, for each of the candidates, a phase map group including of a number of phase maps corresponding to the number of phases, and
   the display control unit displays on a third screen the phase map group for each of the candidates.

6. A sample analyzer comprising the phase analyzer according to claim 1.

7. An analysis method comprising:
   acquiring spectrum imaging data in which a position on a sample is associated with a spectrum of a signal from the sample;
   performing phase analysis based on the spectrum imaging data;
   displaying results of the phase analysis on a first screen;
   when a condition for the phase analysis has been changed, performing phase analysis under the changed condition, and displaying on a second screen the results of the phase analysis performed under the changed condition; and
   reflecting on the first screen the results of the phase analysis displayed on the second screen when a predetermined operation has been performed,
   wherein the condition is the number of phases.

* * * * *